(12) United States Patent
Van Vugt et al.

(10) Patent No.: US 10,966,156 B2
(45) Date of Patent: Mar. 30, 2021

(54) SELF-POWERED INTERNET-OF-THINGS SENSOR DEVICE

(71) Applicant: KONINKLIJKE PHILIPS N.V., Eindhoven (NL)

(72) Inventors: Henricus Antonius Gerardus Van Vugt, Heldmond (NL); Joseph Henricus Gerardus Rous, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 16/643,618

(22) PCT Filed: Sep. 7, 2018

(86) PCT No.: PCT/EP2018/074120
§ 371 (c)(1),
(2) Date: Mar. 2, 2020

(87) PCT Pub. No.: WO2019/052911
PCT Pub. Date: Mar. 21, 2019

(65) Prior Publication Data
US 2020/0213942 A1     Jul. 2, 2020

(30) Foreign Application Priority Data

Sep. 12, 2017  (EP) .................................... 17190661
Jan. 17, 2018  (EP) .................................... 18152017

(51) Int. Cl.
*H04W 52/00*     (2009.01)
*H04W 4/70*      (2018.01)
(Continued)

(52) U.S. Cl.
CPC ............ *H04W 52/028* (2013.01); *H04Q 9/00* (2013.01); *H04W 4/70* (2018.02);
(Continued)

(58) Field of Classification Search
CPC ............. H04W 24/10; H04W 52/0225; H04W 52/0245; H04W 52/028; H04W 84/18;
(Continued)

(56) References Cited

U.S. PATENT DOCUMENTS 7,081,693 B2 *  7/2006  Hamel ..................... H02J 7/345
                                                              307/151
8,995,157 B2 *  3/2015  Ofek ....................... H02M 3/07
                                                              363/127

(Continued)

OTHER PUBLICATIONS

International Search Report and Written Opinion From PCT/EP2018/074120 dated Nov. 15, 2018.

*Primary Examiner* — Quochien B Vuong (57) ABSTRACT

A self-powered sensor device (100) is provided which comprises a wireless network unit (140) configured to enable a communication in a Low-Power Wide-Area Network (LPWAN), an energy converting unit (150) configured to convert a first physical quantity into energy, and an energy harvesting unit (110) configured to harvest energy from the energy converted by the energy converting unit (150), and to initiate a sending of a message via the wireless network unit (140) every time a predetermined amount of energy is harvested by the energy harvesting unit (110).

15 Claims, 5 Drawing Sheets

(51) Int. Cl.
*H04Q 9/00* (2006.01)
*H04W 52/02* (2009.01)

(52) U.S. Cl.
CPC ... *H04Q 2209/40* (2013.01); *H04Q 2209/823* (2013.01); *H04Q 2209/886* (2013.01)

(58) Field of Classification Search
CPC .......... H04Q 2209/40; H04Q 2209/82; H04Q 2209/823; H04Q 2209/88; H04Q 2209/886; H04M 2250/12; H02J 3/385; H02J 7/0047; H02J 7/0068; H02J 7/35; H02J 50/001; H02J 50/80
See application file for complete search history.

(56) References Cited

U.S. PATENT DOCUMENTS

| | | | |
|---|---|---|---|
| 9,379,615 B2* | 6/2016 | Ramorini | H02J 7/35 |
| 9,726,150 B2* | 8/2017 | Littmann | H02P 9/04 |
| 9,726,700 B2* | 8/2017 | Shamir | H02J 13/0006 |
| 10,027,187 B2* | 7/2018 | Matthews | H02J 50/40 |
| 10,027,914 B2* | 7/2018 | Nayar | H01L 27/14643 |
| 2004/0078662 A1 | 4/2004 | Hamel et al. | |
| 2013/0121176 A1 | 5/2013 | Addepalli et al. | |
| 2014/0299783 A1 | 10/2014 | Valentino et al. | |
| 2017/0147021 A1 | 5/2017 | Wu | |

* cited by examiner

SELF-POWERED INTERNET-OF-THINGS SENSOR DEVICE

CROSS REFERENCE TO RELATED APPLICATIONS

This application is a U.S. national phase application of International Application No. PCT/EP2018/074120 filed on Sep. 7, 2018, which claims the benefit of EP Application Serial No. 17190661.3 filed on Sep. 12, 2017 and EP Application Serial No. 18152017.2 filed Jan. 17, 2018 and are incorporated herein by reference.

FIELD OF THE INVENTION

The invention relates to a Self-powered Internet-of-Things sensor device as well as a method of measuring physical quantities with a Self-powered Internet-of-Things sensor device.

BACKGROUND OF THE INVENTION

IoT (Internet of Things) sensor devices are widely used and typically comprise a battery. However, the lifetime of such a sensor device will depend on the capacity and thus the lifetime of the battery. If the battery does not contain any energy anymore, the sensor will stop functioning, unless being serviced (battery replacement). Furthermore, the dimensions of the battery also have a great influence on the dimensions of the sensor device. Such sensor devices will in the short future typically be part of a low-power wide-area network LPWAN, although they could be used in other types of wireless network such as Bluetooth™ Low Energy. A sensor device typically comprises a LPWAN node to enable a communication with the LPWAN.

For environmental reasons as well as for improving the lifetime of an IoT (Internet-of-Things) sensor device, it is desirable to have sensor devices which can operate without a dedicated battery. If a battery can be avoided in the sensor device, then the recycling of such a sensor device is much more environmentally friendly. Moreover, with battery-less IoT sensors, it can be avoided that devices with batteries remain in place even if the life time of the battery has ended. Furthermore, the lifetime of the sensor device can also be increased.

US 2017/0147021 A1 describes an IoT (Internet-of-Things) system having IoT devices which do not contain batteries. The IoT devices comprise energy harvesting devices which harvest energy for example by means of a photo diode. The IoT device can comprise a detector which is operated based on the harvested energy.

SUMMARY OF THE INVENTION

It is an object of the present invention to provide a Self-powered Internet-of-Things sensor device that is self powered and which has an increased lifetime and allows a low power operation.

According to an aspect or embodiment of the invention, a Self-powered Internet-of-Things sensor device is provided. The sensor device comprises an energy converting unit to convert a first physical quantity into energy. The sensor device also comprises an energy harvesting unit to harvest energy associated with the first physical quantity and which has been converted by the energy converting unit. The sensor device also comprises a wireless network unit for enabling a communication in a wireless network, and in particular a low power wide area network LPWAN. Furthermore, a sending of a message via the wireless network unit is initiated every time a first amount of energy has been harvested by the energy harvesting unit. For example, if the first sensor is detecting a light intensity, then the energy harvesting unit will harvest energy by means of a photo detector. A message is sent via the wireless network unit when enough energy (a first amount of energy) has been harvested, i.e. enough energy has been harvested to send out one radio message. In other words, the message itself indicates that an amount of energy has been harvested and thus directly relates to the measured physical quantity. In other words, the message does not need to contain any data. The message itself indicates that an amount of energy has been harvested.

According to an aspect of the invention, an energy storage unit is provided which is used to store energy harvested by the energy harvesting unit. The energy harvesting unit is furthermore adapted to supply a predetermined amount of energy stored in the energy storage unit to the wireless network unit to enable the wireless network unit to send a message.

According to an aspect of the invention, the energy harvesting unit comprises a first converter unit configured to convert a voltage level at an output of the energy converting unit to a voltage level required by the energy storage unit. The energy harvesting unit furthermore comprises a comparator configured to compare the voltage at the energy storage unit to a threshold and to control the switch to supply energy to the wireless network unit to enable a sending of a message.

According to an aspect of the invention, the energy harvesting unit furthermore comprises a second converter unit configured to convert a voltage level in the energy storage unit to a voltage level required by the wireless network unit.

According to an aspect of the invention, the wireless network unit comprises a microprocessor which is configured to store a sequence counter of messages which have been sent.

According to an aspect of the invention, the energy converting unit can be implemented as a photo detector or a piezo-electric element.

According to an aspect, the self-powered sensor device further comprises a second energy storage unit, a second comparator, and a counting unit, wherein the energy harvesting unit is configured to trigger the counting unit every time the energy stored in the energy storage unit reaches a timer threshold and to initiate a sending of a message via the wireless network unit every time an amount of energy stored by the second energy storage unit exceeds a transmission threshold.

According to an aspect, the energy harvesting unit comprises first and second energy harvesters, arranged to store energy in the energy storage unit and the second energy storage units respectively and wherein the first energy harvester is arranged to provide power to the wireless network unit and the wireless network unit is arranged to provide power to the second energy harvester.

According to another aspect of the invention, a method of controlling a self-powered Internet-of-Things sensor device is provided. A first physical quantity is converted into an electrical energy by an electrical energy converting unit. Energy which has been converted by the energy converting unit is harvested by an energy harvesting unit. A message is sent via the wireless network unit every time a predetermined amount of energy has been harvested.

According to a further aspect of the invention, a sequence counter is provided which is incremented for every message sent by the wireless network unit.

According to a further aspect of the inventions, a data rate is adapted by decreasing or increasing a number of messages sent by the wireless network unit.

The sensor device according to an aspect of the invention is a wireless and batteryless sensor device which can communicate within a low-power wide-area network LPWAN or other wireless network. The harvested energy is the same type as the energy which is monitored. Once the harvested energy corresponds to a threshold or when an amount of energy has been harvested, then a first message is sent via the wireless network unit. As soon as the harvested energy again corresponds to the threshold, then a second message is sent via the wireless network unit. The measured value of the physical quantity will then correspond to the number of messages sent via the wireless network, i.e. the physical quantity will then correspond to the number of times, an amount of energy has been harvested. The LPWAN (or other wireless network) messages can have timestamp information and position information.

The messages sent by the sensor device can contain a sequence count value that is incremented with every message sent.

Accordingly, when a message is lost, the receiving unit will still know how much energy has been harvested in total, resulting in a correct measurement. Hence, only time information may be lost in this situation when a message is lost.

It shall be understood that a preferred embodiment of the present invention can also be any combination of the dependent claims or above embodiments with the respective independent claim.

These and other aspects of the invention will be apparent from and elucidated with reference to the embodiments described hereinafter.

DETAILED DESCRIPTION OF THE EMBODIMENTS

Figure 1A:
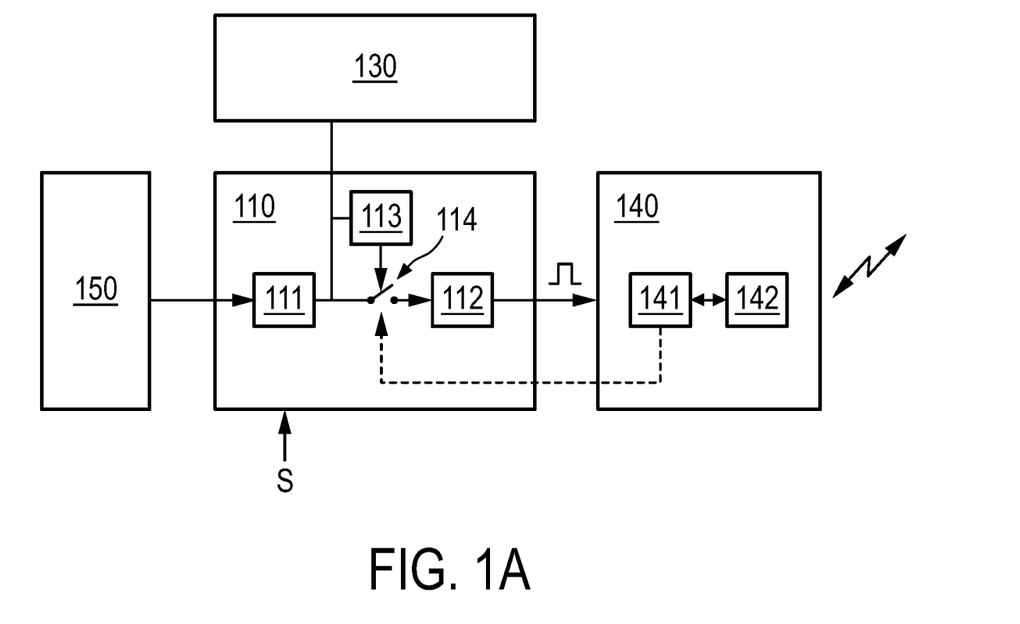
FIG. 1A shows a schematic block diagram of a sensor device according to a first aspect of the invention.

FIG. 1 shows a schematic block diagram of a sensor device according to a first aspect of an embodiment of the invention. The sensor device 100 according to an aspect of the invention is a Self-powered Internet-of-Things (IoT) sensor device 100 which can be part of a wireless network such as a Low-Power Wide-Area Network LPWAN, though other types of network such as Bluetooth™ Lowe Energy.

The sensor device 100 comprises an energy harvesting unit 110, an energy storage unit 130, a wireless network unit 140 and an energy converting unit 150 (i.e. an energy converter). The sensor device 100 can wirelessly communicate with the LPWAN via the wireless network unit 140. The energy storage unit 130 may be a capacitor or similar charge storage device or even a super capacitor if the wireless network unit requirements so dictate.

The energy collecting unit 150 can detect a physical quantity or phenomenon like light, heat or motion and convert the physical quantity into electrical energy. Therefore, the energy converting unit can for example be embodied as a photo detector 150 or a piezo-electric element converting kinetic energy in electrical energy. The energy harvesting unit 110 is harvesting energy which is associated to the first physical quantity. For example, if the energy converting unit 150 is a photo detector, the energy harvesting unit 110 will harvest energy by means of a conversion of light to electrical energy. This can for example be performed by means of the energy converting unit 150 (in form of a photo detector).

When the energy harvested by the energy harvesting unit 100 reaches a first threshold or amount, then a first message is send via the wireless network unit 140. In other words, this message will indicate that energy corresponding to the first threshold or amount has been harvested by the energy harvesting unit 110. If thereafter the energy harvesting unit 110 has harvested energy which reaches the first amount again, a further message is send via the wireless network unit 140. It should be understood that wireless network unit 140 withdraws only the energy needed for sending the message and any surplus energy in the energy storage unit 130 remains there for a subsequent message. At the reception side in the Low Power Wide Area Network LPWAN, a receiver can receive the messages which are wirelessly transmitted by means of the wireless network unit 140. The wireless network 140 can comprise a microprocessor 141 and a radio module 142.

The energy harvesting unit 110 comprises a circuit which enables the charging of the energy storage unit by the energy harvested by the energy collecting unit and furthermore to supply energy for the wireless network unit 140 to send a message.

In particular, the energy harvesting unit 110 may comprises a boost charger 111, a buck converter 112, a comparator 113 and a switch 114. The boost charger 111 receives the output of the energy converting unit 150 and can convert a voltage level of the output of the energy converting unit 150 to a voltage level which is required for the energy storage unit 130. The comparator 113 monitors the voltage level at the energy storage unit 130. If the voltage level at the energy storage 130 corresponds to a threshold then the comparator can control the switch 114 such that energy from the energy storage 130 can be converted by the buck converter 112 to a voltage level required by the wireless network unit 140. If the wireless network has been supplied with sufficient energy to send a message, the switch 114 can be switched off. The switching off can for example be performed by the microprocessor 141 of the wireless network unit 140.

Optionally, the energy harvesting unit 110 may comprise inputs for receiving settings. These inputs can also be used to couple a resistor network to the energy harvesting unit 110.

Optionally, a sensor 170 can be provided which can be adapted to measure or detect a further physical quantity.

At the receiver side in the network, timestamp information and position information can be generated. As the receiver side can associate a timestamp to any incoming messages, the timestamp information of the message is available. Position information of the sensor device can be obtained at the receiver side by triangulation. If multiple antennas received the same message, the location of the sensor device can be determined.

Figure 1B:
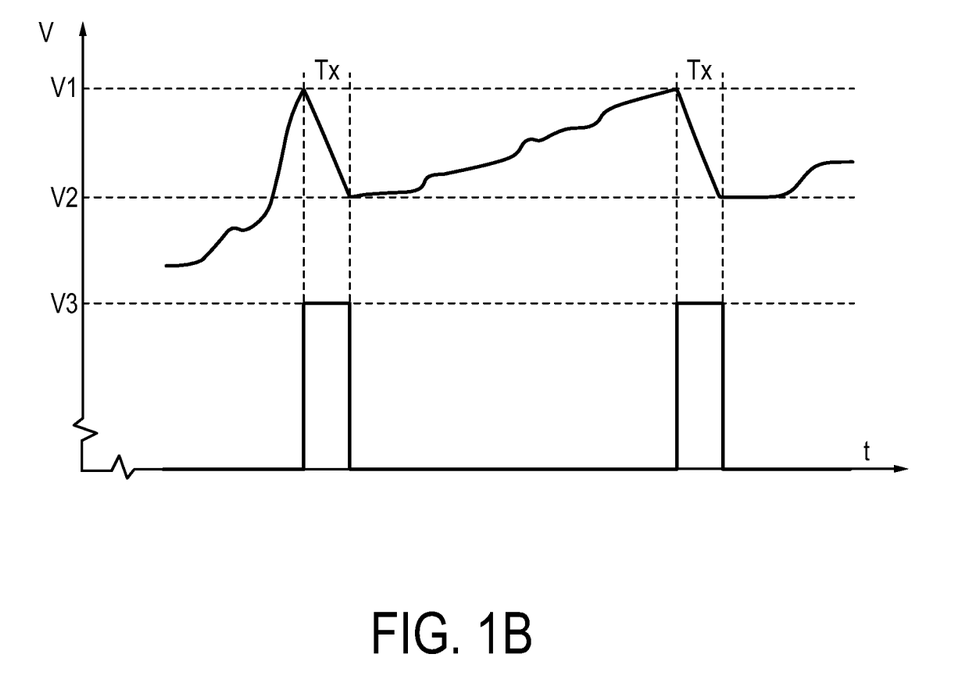
FIG. 1B shows a graph of a time diagram of an energy harvesting procedure according to an aspect of the invention.

FIG. 1B shows a graph of a time diagram of an energy harvesting procedure according to an aspect of the invention. In FIG. 1B the voltage V1, V2 at the energy storage 130 and the voltage V3 at the input of the wireless network unit 140 are depicted. The voltage V3 corresponds to the voltage at the input of the wireless network unit. The voltage V1 corresponds to the voltage level when sufficient energy has been stored in the energy storage unit 130 to enable the wireless network unit 140 to transmit a message. The voltage level V2 corresponds to the voltage level at the energy storage unit 130 when a message has been sent by the wireless network unit 140. When the message has been sent Tx then the voltage level at the energy storage unit drops from V1 to V2. Thereafter, the voltage level at the energy storage unit 130 is increasing due to the energy harvested by the energy collecting unit 150. As soon as the voltage level in the energy storage unit 130 reaches the voltage level V1, the energy harvesting unit 110 provides energy to the wireless network unit 140 to send a message. During the sending of the message via the wireless network unit 140 the voltage level at the energy storage unit 130 drops from V1 to V2.

Figure 2:
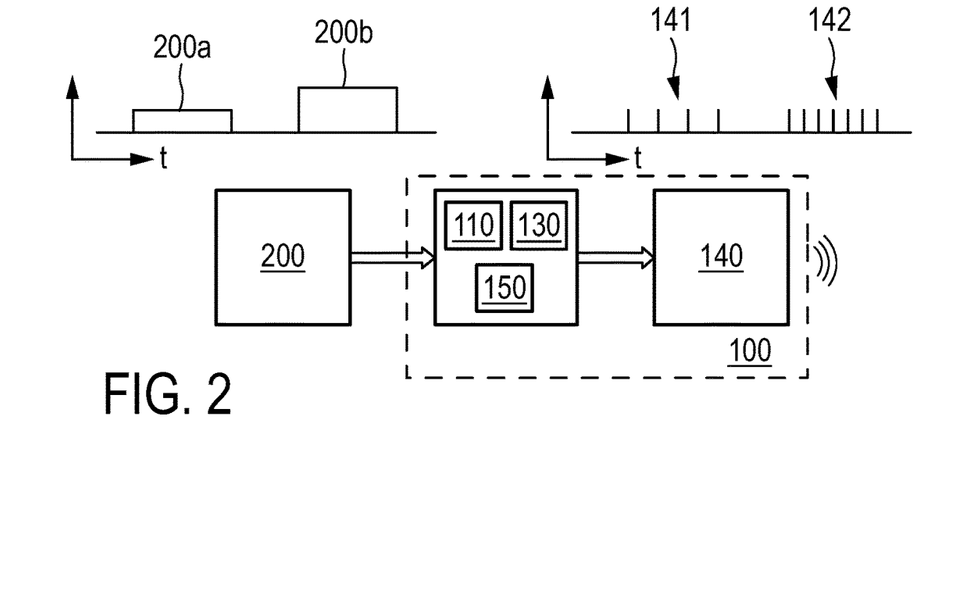
FIG. 2 shows a schematic representation of the operation of a sensor unit according to an aspect of the invention.

FIG. 2 shows a schematic representation of the operation of a sensor device according to an aspect of the invention. In FIG. 2, the sensor device 100 is divided into two functional blocks, namely one block related to the energy gathering and a second block relating to the wireless network unit. In the first block, the energy harvesting unit 110, the energy storage unit 130 and the energy converting unit 150 are provided. The wireless network unit 140 can communicate to a low power wide area network. The energy 200 (which is to be harvested) is harvested by the energy harvesting unit 110. In FIG. 2 (as an example), two different energy amounts 200a, 200b are harvested. According to the invention, the sensor device 100 will output four messages 141, i.e. each time when the first amount of energy 201 has been harvested. The sensor device is continuously harvesting energy. When the second amount of energy 202 is harvested, the sensor device will output seven messages 142. As can be seen from FIG. 2, the distance between the messages 141 is much larger than the distance between the messages 142.

As the energy level during time period 200b is higher than during time period 200a the sensor device 100 will send more messages. If no messages are sent then there is no energy which can be harvested. In other words, the absence of messages may also relate to valuable information as it will indicate that, for example there is no light or genetic energy.

The operation of the sensor device according to an aspect of the invention can be described as follows: As soon as a bucket of energy is full, the sensor device will sent a message. Due to the sending the bucket is (partially) emptied and as soon as the bucket is full again, a further message is sent. If more energy is present, the filling of the bucket will be faster (as with the messages 142). However, if the energy level is less, then the filling of the bucket will take more time (see messages 141). Thus According to an aspect of the invention, the physical quantity which is to be sensed by the sensor device 100 corresponds or relates to the energy which is harvested and vice versa. If for example the energy converting unit 150 is a photo detector, then the photo detector can detect light and convert the light into electrical energy. As soon as a first amount of electrical energy has been converted by the photo detector, a message is sent from the sensor device 100. This message indicates that a first amount of energy has been converted by the photo detector, i.e. a first amount of light has been detected. This process can be an iterative process such that the sensor device 100 can send a number of messages. This is advantageous as the message will not contain a value but the occurrence of messages over time (i.e. number of messages over time) indicate the physical quantity which is monitored. Thus, a robust and low complex sensor device is provided within an internet-of-things system.

The wireless network unit 140 can comprise a microprocessor 141 and a radio module 142. As soon as the energy harvesting unit 110 has harvested sufficient energy, the microprocessor 141 and the radio module 142 in the wireless network unit 140 are activated to send a first radio frequency RF message. In other words, the energy harvesting unit 110 will provide sufficient energy for the wireless network unit 140 to send the RF message. The microprocessor 141 may be adapted to process an algorithm which will send out 1 RF message as soon as sufficient energy is provided. The control unit 120 can then initiate a deep sleep of the wireless network unit 140.

According to an aspect of the invention, the size of the 1 RF message is minimized to prevent unnecessary power consumption.

According to an aspect of the invention, if more energy is harvested than required for a sending of the RF message, the extra amount of energy can be used to measure additional physical quantities. Hence, further sensors 170 may be present in the sensor device 100. For example, if light is used to harvest energy, then ultraviolet light may be detected with the extra amount of harvested energy.

According to a further aspect of the invention, an additional accuracy can be provided by writing energy bits into a non-volatile memory of the microprocessor inside the wireless network unit, if sufficient energy has been harvested by the energy harvesting unit 110. This can in particular be performed if the amount of energy harvested by the energy harvesting unit 110 is not sufficient to allow a transmittance of the RF message. If sufficient energy has been harvested by the energy harvesting unit, then a collected number of bits can be communicated wirelessly.

Figure 3:
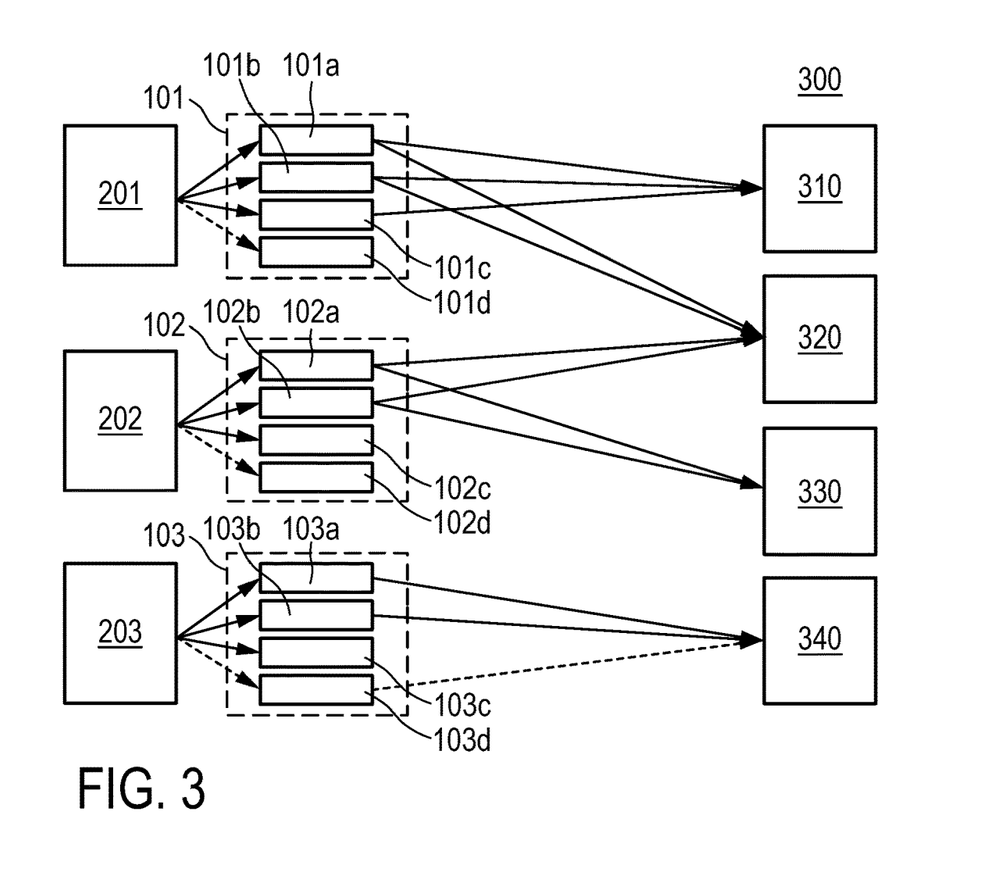
FIG. 3 shows an illustration of an energy harvesting procedure according to an aspect of the invention.

FIG. 3 shows an illustration of an energy harvesting procedure according to an aspect of the invention. FIG. 3 illustrates that different energy sources can be harvested for different applications. A first energy harvesting procedure 101 can extract electrical energy from kinetic energy. Hence, the sensor device 100 according to FIG. 1A can be used. Accordingly, the first energy harvesting procedure 101 can transmit a number of messages 101a which correspond to the amount of harvested kinetic energy. The number of messages transmitted 101a can be used by an activity unit 310 to determine the activity of a user.

A second energy harvesting procedure 102 may use the sensor device 100 according to FIG. 2. The second energy harvesting procedure 102 uses the available light 202 to harvest energy by means of the energy harvesting unit 110 and send a number of messages 102a via the wireless network unit 140. The information of the number of messages 102a from the second energy harvesting procedure 102 as well as optionally together with the number of messages from the first sensor device 101 can be used by a sleep unit 320 to determine the sleep quality of a user.

Furthermore, the information on the number of messages and the corresponding timestamps may be used by an anti-depression application 330 which has the received amount of daylight as input.

A third energy harvesting procedure 103 uses ultraviolet light to extract energy by means of the energy harvesting unit 110. The third energy harvesting procedure 103 can use a sensor device 100 according to FIG. 2. Therefore, the number of messages 103a sent by the energy harvesting procedure 103 corresponds to the amount of ultraviolet light. This information together with corresponding timestamps can be used by an ultraviolet protection unit 340 to determine an ultraviolet protection of a user in other words to help the user to avoid sunburns etc. Optionally, extra sensors may be provided. The information of the sensors may also be forwarded to the ultraviolet protection unit. Alternatively, the third energy harvesting procedure can harvested light like daylight and can use an additional sensor to give a UV indication. The messages which are send can contain an UV indication.

According to the invention, the sensor devices are batteryless sensor devices and can thus also be incorporated into healthcare applications and can be used or worn by the user. Such sensor device may be incorporated into watches or jewelry or shoes or the like. For example, if a sensor device is incorporated into a shoe, it may be able to measure the activity of a user. Alternatively, if a sensor device is implemented in jewelry such as a ring or a watch, daylight or ultraviolet light levels may be measured.

According to an aspect of the invention, a piezo electric component may be used as energy collecting unit to extract electrical energy from the kinetic energy.

According to a further aspect of the invention, the sensor device may be used to measure light and can be implemented or attached to a plant in order to determine whether the plant has sufficient light. Optionally, the sensor device may also have a humidity detection unit to determine the humidity of the soil of the plant also in order to determine whether the plant has sufficient water. A number of messages which are received by a receiver side in the wireless network can allow a determination whether or not the light levels are okay and/or whether or not the humidity levels are okay. The sensor device according to the invention is operated as a measuring device. The receiver side in the wireless network can further process the received information.

According to an aspect of the invention, a sensor device may be implemented in a street light in order to determine the outside light and thus control the light of the street light.

According to a further aspect of the invention, a sensor device can also be implemented in a street light to determine whether the street light is emitting light. If the sensor device does not transmit messages, then it is clear that the street light does not work as required.

According to a further aspect of the invention, the sensor device can be used to detect an alternating magnetic field around main wires to measure or determine a power consumption of a device. The sensor device according to the invention may use the alternating magnetic field to extract electrical energy and to operate the sensor device.

According to a further aspect of the invention, the messages may contain a sequence counter which can be incremented for every message is sent. The sequence counter may be stored in the non-volatile memory of the microprocessor 141. This is advantageous as even if some of the messages which are sent by the sensor device 100 are lost during the transmission then in any of these subsequent messages, the sequence count will contain the required information so that on the receiver side, the correct transmission rate and hence energy levels harvested can be inferred. The typical solution to the problem of lost messages is to use higher power or more complicated transmission schemes involving error correction (for example message redundancy).

According to a further aspect of the invention, an automatic data-rate adjustment can be performed at the receiver side of the wireless network. The receiver side of the network can instruct the sensor device to decrease the number of messages by a factor (for example 2) if the sequence counter is continuously incremented by more than one. This can indicate that the amount of energy which corresponds to a forwarding of a message is to small. Therefore, the sensor device may be adapted to send a message, only if the voltage level in the energy storage has reach the first amount twice. In other words, some of the messages which are supposed to be sent can be dropped.

According to a further aspect of the invention, downlink messages may be provided. These downlink messages may require more energy than just sending uplink messages.

According to a further aspect of the invention, a sequence counter can be incremented regardless whether or not an RF message is sent.

Figure 4:
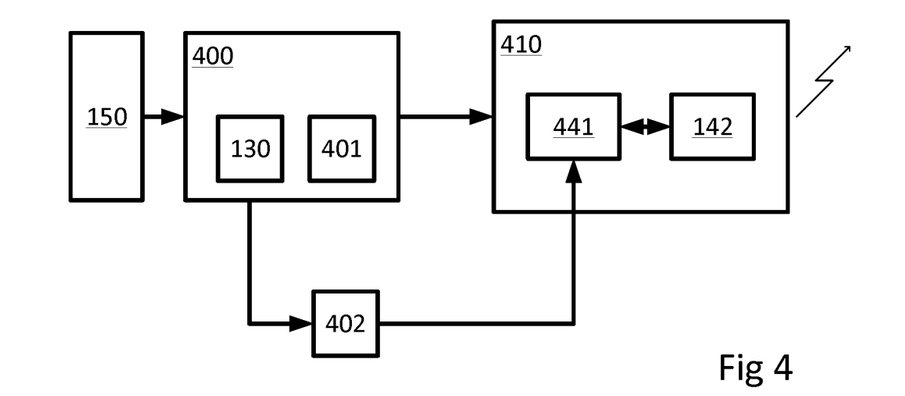
FIG. 4 shows a schematic representation of the operation of a sensor unit according to a further embodient of the invention.

FIG. 4 represents the operation of another embodiment of the invention. As before, an energy collecting unit 150 provides energy to an energy harvesting and storage unit 400. The energy harvesting and storing unit 400 has the elements of the energy harvesting unit 100 previously described, a first energy store 130 and a second energy store 401. The energy harvesting and storage unit 400 provides input to a wireless network unit 410 according to the embodiment. The energy harvesting and storage unit also provides input to a counting unit 402. The counting unit 402 then provides input to the microprocessor 141 of the wireless network unit 440. The counting unit 402 may comprise a means of recording the time such as a real-time clock (RTC) which records when inputs are received from (or when it is triggered by) the energy harvesting and storage unit 400. In turn, the counting unit 402 provides this information to the microprocessor 141.

Figure 5A:
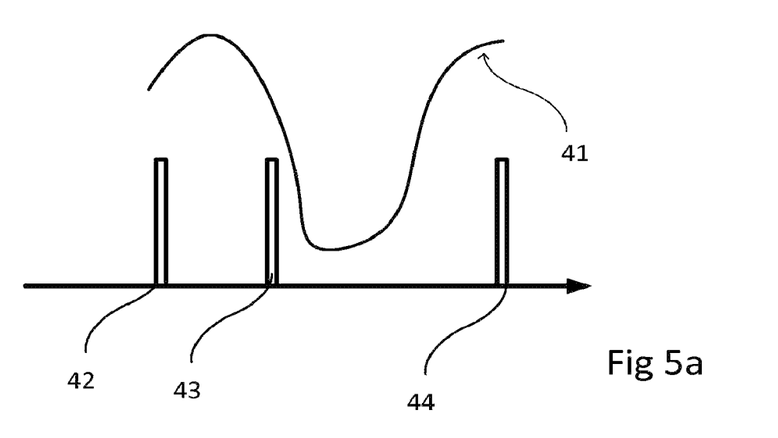
FIGS. 5a and 5b represent the operation of embodiments of the invention.

FIG. 5a represents the operation of a sensor device according to an embodiment of the invention which does not have the extra features of the embodiment of FIG. 4. Curve 41 represents levels of energy incident (or otherwise available) to the energy collecting unit 150 and pulses 42, 44 and 44 represent the radio transmissions made by the wireless network unit 140. Pulses 42 and 43 are relatively close together because the total amount of energy in that period was relatively high. Then, a longer time occurs before pulse 44 is sent because, as curve 41 shows, there was a drop in the energy level resulting in a longer time to collect the energy required for the transmission. It is not possible for the receiver of the pulses to deduce the form of curve 41 from the information received. The frequency of pulses represents the energy levels integrated or summed over the inter-pulse period.

Returning to FIG. 4, the first energy store 130 is used to power and trigger the counting unit 402. 'Trigger' in the present context means 'cause an action to occurr' and could also include waking up a device so that it performs a function. In a manner like that described previously, when the energy stored by the first energy store 130 reaches a first threshold (for example when a voltage level at the energy store 130 reaches a threshold), the counting unit 402 is triggered by an input from the energy harvesting and storage unit 400. This causes the counting unit 402 to make record of the triggering, in particular of the time the triggering occurred. This can be referred to as a 'counting event' or a 'timing event'. The counting unit 402 could be implemented as part of the microprocessor 441 or as a standalone unit. In the event that the counting unit 402 forms part of the microprocessor 441, it is the microprocessor 441 which is triggered. In this case, 'triggering' could mean that the microprocessor is woken up by having power supplied to it (and any necessary enables) causing it to read the timing or counting information from the counting unit 402 and store it. In general, where 'triggering of the counting unit' is referred to, it should be understood that this means 'triggering of the microrocessor', where appropriate. When the energy level (for example measured as a voltage level) in energy store 401 reaches another, second, threshold, the energy harvesting and storage unit 400 provides energy to the wireless network unit 410. The microprocessor 441 of the wireless network unit 400 retrieves the records of the counting events from the counting unit 402 and encodes them as part of the payload of a message. The message is then transmitted by the radio module 142. For convenience, the first threshold can be called the timer threshold and the second threshold can be called the transmission threshold. The two thresholds do not need to be set at the same level, indeed this will depend on the capacity of the two energy stores 130 and 401 and the energy required for the counting unit 402 and the wireless network unit 410. The transmission threshold may be the same as that for the embodiment of FIG. 1.

Figure 5B:
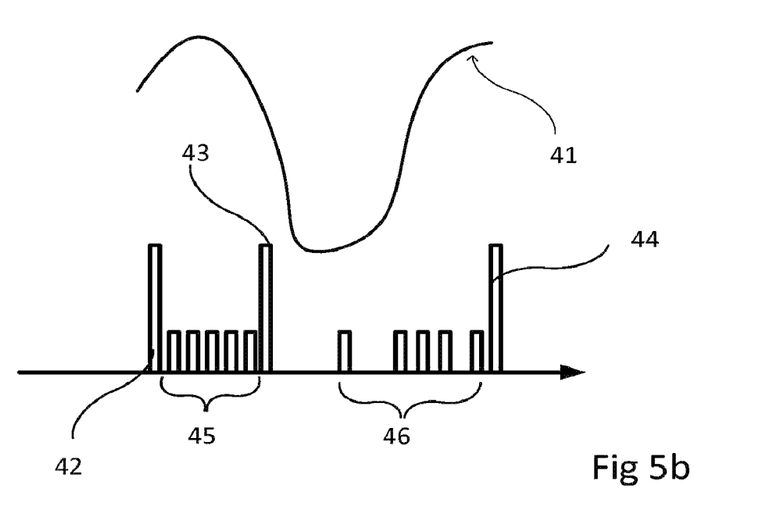

FIG. 5b represents the operation of a sensor device according to the embodiment of FIG. 4. As with FIG. 5a, curve 41 represents the levels of incident or available energy. Also, as before, radio transmissions are made at the times indicated by pulses 42, 43 and 44. In addition, pulses trains 45 and 46 represent triggerings of the counting unit 402. As can be seen, pulse train 45 shows frequent triggering of the counting unit meaning that a series of relatively closely spaced times will be recorded. Correspondingly and as with FIG. 1, radio transmissions 42 and 43 are relatively close. In the early part of the period between transmissions 43 and 44, the energy available drops and so the triggerings of the counting unit 402 occurr less frequently, as shown by the pulsetrain 46. Toward the end of this period, the available energy level rises and the triggerings of the counting unit 402 are more frequent again. As can be seen, the pattern of the triggerings in pulse train 46 represents the variations of the available energy level 41. Thus the receiver of messages according to this embodiment is able to deduce the variations of the energy levels with higher time resolution.

The recording of time may allow the transmissions from the wireless network unit 410 to be made less frequently because the time resolution is provided by the time values in the messages. However, less frequent transmissions means that more information is in each message which tends to make the message longer, requiring more energy to transmit. Therefore, there is a trade-off between transmission frequency and message length. It may be possible to reduce the message length by choices in how the information is encoded in the message.

Various approaches for recording the time and encoding the messages exist. One would be to place absolute values for each time record in order. However, it may be possible to save bits by encoding relative values since the absolute values would have to contain a time and date and allocation (in bits) would have to be made for a wide range of values. Relative values, on the other hand, have a much narrower range and so can be represented with fewer bits. One example of implementations of such relative values could be having only the first time record encoded in absolute format and the following time records up until the time of the transmission in question being encoded as a difference relative to the first time record. Another could be as values relative (negative) to the time of the transmission in question. The receiver will be able to determine itself the transmission time since this will be very close the time of reception. If the relationship between energy required for triggering the counting unit 402 and transmitting a message is kept constant, then there will always be the same number of timer records between transmissions. This means that the message will always have the same length which makes the decoding at the receiver-side simpler. It is possible to implement dynamic adaptation of relationship but this would require some more complexity such as a message length indication in the message or adaptive decoding.

In another approach, the value stored from the counter/RTC is a count of clock ticks between the previous counting event and the current counting event. In this case the counter may be reset at each triggering of a counting event. The payload of the transmitted message may then be a series of count values. The receiver may then use the time of receipt of the message to calculate back to the actual times of the counting events and so reconstruct a sampled curve for the incident energy.

Figure 6:
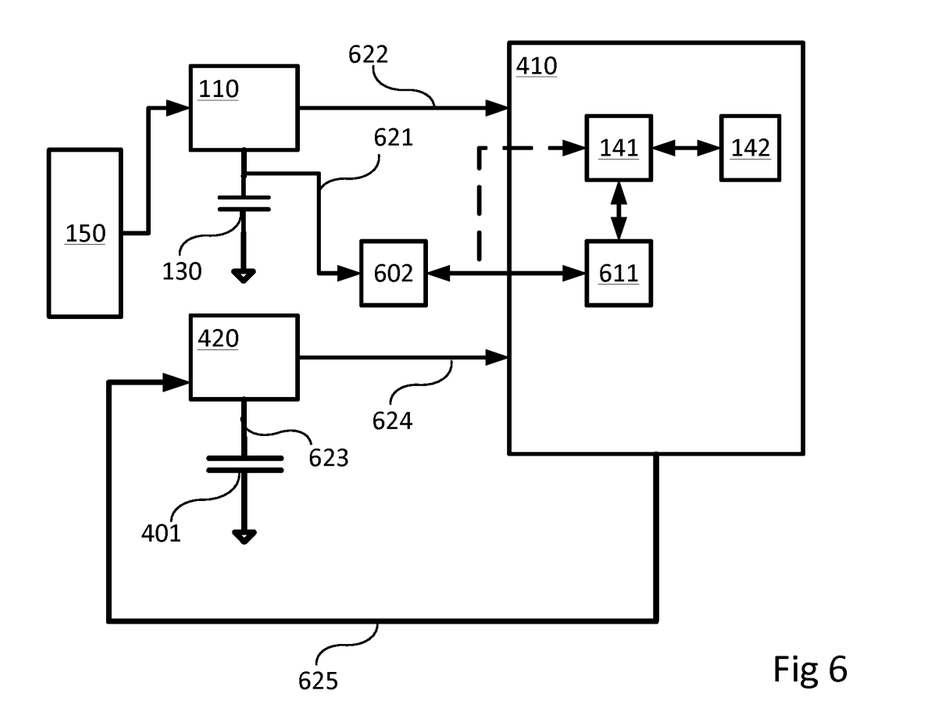
FIG. 6 represents another embodiment according to the functionality of FIG. 4.

FIG. 6 represents another embodiment according to the functionality of FIG. 4. An energy collecting unit 150 supplies energy to a first energy harvester 110. This first energy harvester 110 is similar to that described in respect of FIG. 1 and is coupled to a first energy storage unit 130. The first energy storage unit 130 may be implemented as a capacitor coupled between an charging output 621 of the first energy harvester 110 and a reference voltage. Also coupled to the charging output 621 of the first energy harvester 110 is a counter-RTC 602. The first energy harvester 110 has one or more voltage/signalling outputs 622 coupled to an input of the wireless network unit 410. The counter-RTC is coupled to a non-volatile memory (NVM) 611 in the wireless network unit 410. The NVM is coupled to a microprocessor 141 in the wireless network unit 410. There are various configurations possible for the counter-RTC 602 i.e. it may be as a standalone circuit or part of the functionality may be in the microprocessor 441 (for example, the counter part), as indicated by the optional dotted coupling. In the event that it is standalone, it may be coupled to the NVM. In the event that the functionality is shared with the microprocessor 441, the counter-RTC may be coupled with the microprocessor 441, rather than to the NVM. It is also possible to use a microprocessor 441 which has its own RTC. A second energy harvester 420 is coupled to a second energy storage unit 401. The second energy storage unit 401 may be implemented as a capacitor coupled between a charging output 623 of the first energy harvester 420 and a reference voltage. The second energy harvester 420 has one or more voltage/signalling outputs 623 coupled to a second input of the wireless network unit 410. The second input of the wireless network unit 410 may be the same input as that coupled to the first energy harvester 130. The wireless network unit has a power output 625 coupled to the power input of the second energy harvester 420. Energy store 130 may have a lower storage capacity than the second energy storage unit 401.

The first energy harvester 110 collects energy and stores it in the first storage unit 130. When the energy stored reaches a first or 'timer' threshold (for example when the voltage at the charging output 621 reaches a threshold), the first energy harvester 110 signals and provides power to the wireless network unit 410, in particular to the microprocessor 141. The microprocessor 141 reads the time in the counter/RTC 602 and stores it in the NVM. The wireless network unit 410 keeps receiving power until the energy level in the energy storage unit 130 drops below a second or 'power off' threshold and during this period, the microprocessor 141 provides power to the second energy harvester 420 via the power output 625. The second energy harvester 420 stores the energy in the second energy storage unit 401. The microprocessor 141 then stops providing power to the second energy harvester circuit 420. This process is repeated until the energy level stored in the second energy storage unit 401 reaches a 'transmission' threshold. At this point, the second energy harvester 420 signals and provides power to the wireless network unit 410. The microprocessor 141 reads the records in the NVM and compiles a message which the radio module 142 transmits. It may be advantageous for the microprocessor 141 to have a 'low power' mode which it functions under while receiving power from the first energy harvester 110. In this way, the power the microprocessor 141 can provide to the second energy harvesting circuit 420 can be that much greater. The first and second energy harvesters 130, 420 may be implemented using the same circuitry. It may be convenient to do this because they require similar functionality. However, the second energy harvester may be implemented with a different circuit if that proves more economical. These decisions depend on the specifics of the implementation and are within the reach of the skilled person.

Whilst it is theoretically possible to have an energy collecting circuit power both energy harvesters, this presents certain obstacles. A means of dividing the energy according to some design (as opposed to just connecting) would be required so as to ensure a correct balance. The embodiment of FIG. 6 has advantages in that the sharing of the harvested energy and hence the balance between time recording and transmission can be managed by programming.

According to a further aspect of the invention, kinetic energy can be harvested for example by means of a piezo electric unit as energy collecting unit. This can be used for human activity monitoring and/or in the tracking of a route of a walk or a run.

According to a further aspect of the invention, a shoe replacement procedure can be implemented by determining a shoe wear out or an end-of-life of running shoes by harvesting kinetic energy.

According to a further aspect of the invention, a light can be harvested and can be used for plant health monitoring (optionally with a sensing of soil humidity) and low-cost crop monitoring (optionally with a sensing of soil humidity).

According to a further aspect of the invention, kinetic energy can be harvested for use in industrial flow monitoring.

The term 'microprocessor' shall be understood to include logic circuits in general, including what are commonly termed microcontrollers.

While the invention has been illustrated and described in detail in the drawings and forgoing description, such illustration and description are to be considered illustrative and exemplary and not restrictive; the invention is not limited to the disclosed embodiments. Other variations of the disclosed embodiments can be understood and effected by those skilled in the art in practicing the claimed invention, from a study of the drawings, the disclosure and the claims.

In the claims, the word "comprising" does not exclude other elements or steps and the infinite article "a" or "an" do not exclude a plurality. A single element or unit may fulfill the functions of several items recited in the claims. The mere fact that certain measures are recited in mutual different independent claims does not indicate that a combination of these measures cannot be used to advantage. In the claims, any reference signs placed between parentheses shall not be construed as limiting the claim.

The invention may be implemented by means of hardware comprising several distinct elements, and by means of a suitably programmed computer or processing unit. In the device claim enumerating several means, several of these means may be embodied by one and the same item of hardware. The mere fact that certain measures are recited in mutually different dependent claims does not indicate that a combination of these measures cannot be used to advantage.

Aspects of the invention may be implemented in a computer program product, which may be a collection of computer program instructions stored on a computer readable storage device which may be executed by a computer. The instructions of the present invention may be in any interpretable or executable code mechanism, including but not limited to scripts, interpretable programs, dynamic link libraries (DLLs) or Java classes. The instructions can be provided as complete executable programs, partial executable programs, as modifications to existing programs (e.g. updates) or extensions for existing programs (e.g. plugins). Moreover, parts of the processing of the present invention may be distributed over multiple computers or processors.

Storage media suitable for storing computer program instructions include all forms of nonvolatile memory, including but not limited to EPROM, EEPROM and flash memory devices, magnetic disks such as the internal and external hard disk drives, removable disks and CD-ROM disks. The computer program product may be distributed on such a storage medium, or may be offered for download through HTTP, FTP, email or through a server connected to a network such as the Internet.

The reference signs in the claims should not be construed as limiting the scope.

The invention claimed is:

1. A self-powered sensor device, comprising:
 a wireless network unit configured to enable a communication in a wireless network, the wireless network unit comprising a microprocessor, wherein the microprocessor is configured to store a sequence counter of messages which have been sent and incorporate the sequence counter value in each message;
 an energy converting unit configured to convert a first physical quantity into energy, and
 an energy harvesting unit configured to harvest energy from the energy converted by the energy converting unit, and to initiate a sending of a message via the wireless network unit every time an amount of energy harvested by the energy harvesting unit exceeds a threshold.

2. The self-powered sensor device of claim 1, further comprising:
 an energy storage unit configured to store energy harvested by the energy harvesting unit,
 wherein the energy harvesting unit is configured to supply a predetermined amount of energy stored in the energy storage unit to the wireless network unit to send a message.

3. The self-powered sensor device of claim 2, wherein the energy harvesting unit comprises a first converting unit configured to convert a voltage level at an output of the energy converting unit to a voltage level required by the energy storage unit, and a comparator configured to compare the voltage at the energy storage unit to a threshold and to control a switch to supply energy to the wireless network unit to enable a sending of the message.

4. The self-powered sensor device of claim 3, wherein the energy harvesting unit furthermore comprises a second converter unit configured to convert a voltage level in the energy storage unit to a voltage level required by the wireless network unit.

5. The self-powered sensor device of claim 2, further comprising a second energy storage unit, a second comparator, and a counting unit, wherein the energy harvesting unit is configured to trigger the counting unit every time the energy stored in the energy storage unit reaches a timer threshold and to initiate a sending of a message via the wireless network unit every time an amount of energy stored by the second energy storage unit exceeds a transmission threshold.

6. The self-powered sensor device of claim 5, wherein the energy harvesting unit comprises first and second energy harvesters, arranged to store energy in the energy storage unit and the second energy storage units respectively and wherein the first energy harvester is arranged to provide power to the wireless network unit and the wireless network unit is arranged to provide power to the second energy harvester.

7. The method of controlling a self-powered sensor device according to claim 6, further comprising adapting a data rate by decreasing a number of messages sent by the wireless network unit.

8. The self-powered sensor device of claim 1, wherein the energy converting unit is a photo detector or a piezo-electric element.

9. A receiver configured to operate in a network comprising at least one self-powered sensor device according to claim 1.

10. The receiver of claim 9, further configured to convert a frequency of messages or a message number in a message received from the sensor into a measure of the energy of a physical quantity detected by the sensor.

11. A network comprising at least one self-powered sensor device according to claim 1.

12. A method of measuring a physical quantity, comprising:

converting a first physical quantity into an electrical energy by an electrical converting unit:

harvesting energy from the energy converted by the energy converting unit; and sending a message via a wireless network unit every time an amount of energy harvested exceeds a threshold, storing a value in a sequence counter and sending a message via a wireless network unit wherein the message contains the sequence counter value.

13. The method of controlling of claim 12, further comprising providing a sequence counter which is incremented in the message sent by the wireless network unit.

14. The method of claim 12, wherein the energy harvested is used to trigger a counting event whenever the amount of energy harvested exceeds a timing threshold in between sendings of messages wherein the message sent contains a count value produced by a timing event.

15. A non-transitory computer program product stored on a computer-readable medium, which when executed by a processor, causes the processor to perform the method of claim 12.

* * * * *